United States Patent

Ratcliffe

[15] 3,643,247
[45] Feb. 15, 1972

[54] APPARATUS FOR DETECTING OPEN-CIRCUIT CONDITION

[72] Inventor: David J. Ratcliffe, Morristown, N.J.
[73] Assignee: Lockheed Aircraft Corporation, Burbank, Calif.
[22] Filed: Dec. 22, 1969
[21] Appl. No.: 887,070

[52] U.S. Cl. ............................. 340/251, 315/135, 340/256
[51] Int. Cl. ............................................. G08b 21/00
[58] Field of Search ............... 340/251, 256, 52, 59; 315/82, 315/83, 129, 135; 328/8–10, 148

[56] References Cited

UNITED STATES PATENTS 3,252,157  5/1966  Pabst ............................. 340/251 X
3,514,751  5/1970  Pascente ......................... 340/251 X
3,001,100  9/1961  Schuh et al. ..................... 328/8 X
3,372,372  3/1968  Carpenter et al. ................ 340/52 X Primary Examiner—John W. Caldwell
Assistant Examiner—Daniel Myer
Attorney—Roger T. Frost and George C. Sullivan

[57] ABSTRACT

Apparatus for detecting an open-circuit condition in a circuit element such as an indicator lamp irrespective of whether the circuit is switched on or off. A trickle current flowing through the circuit element is interrupted if the element becomes open, and this trickle current controls a suitable indicator.

6 Claims, 2 Drawing Figures

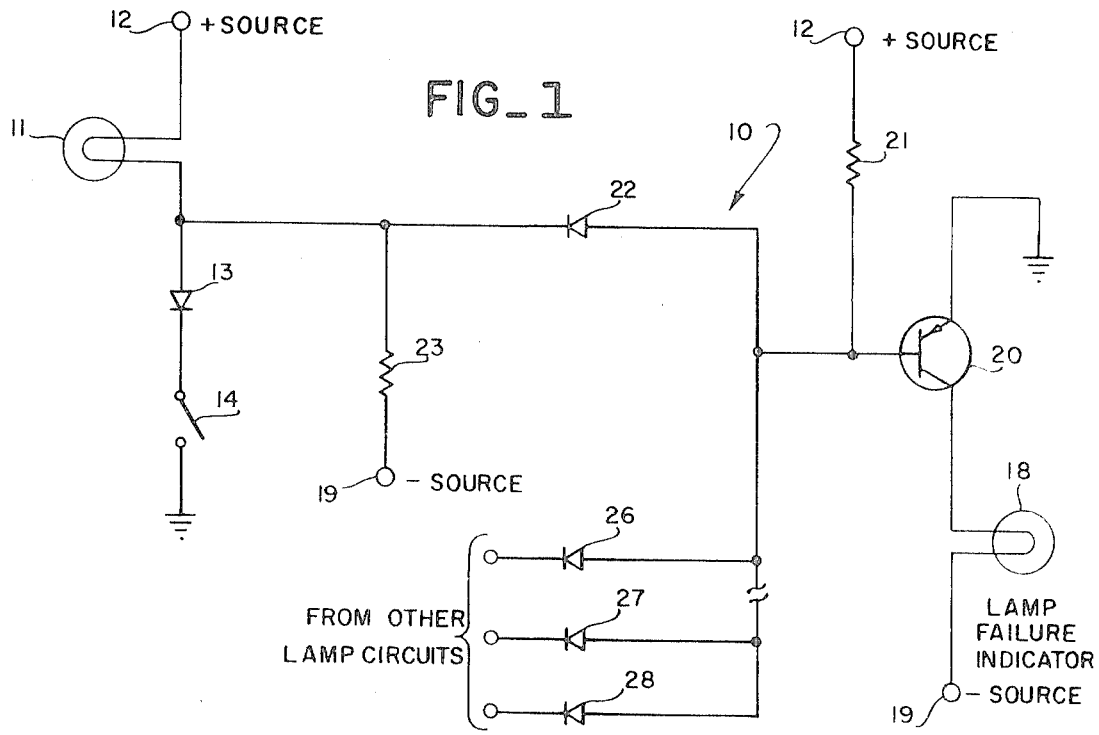
FIG_1
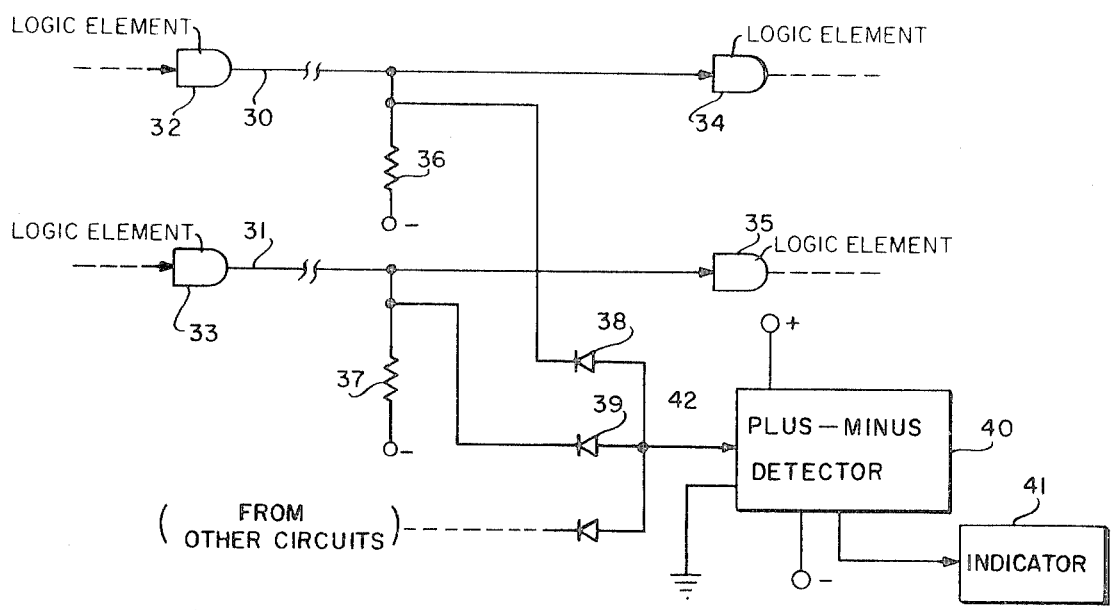
FIG_2
INVENTOR.
DAVID J. RATCLIFFE

APPARATUS FOR DETECTING OPEN-CIRCUIT CONDITION

This invention relates in general to apparatus for evaluating the condition of an electrical circuit and in particular to apparatus for detecting the occurrence of an open-circuit condition in a circuit element.

Electrical circuits frequently use circuit elements, such as indicator lamps, which are switched on or off to represent various conditions. With the use of devices such as indicator lamps, however, one can never be certain whether an unlit lamp simply indicates that no voltage is applied to the lamp, or whether the lamp is burned out and is incapable of performing an indicating function. This ambiguous indication implied by an unlit indicator lamp is familiar to any motorist who is forced to rely on indicator lamps which light only if some malfunction, such as low oil pressure or alternator failure, occurs.

The hazards of an inoperative indicator lamp that is not detected are much greater where the lamp is used in a critical environment such as, for example, the instrument panel of an aircraft cockpit. Furthermore, many indicating devices use a plurality of lamps which are illuminated in selected ways to convey the desired information. For example, segmented displays of a type known to those skilled in the art use elongated indicator lamps to form portions of alphanumeric figures. The undetected failure of only one lamp in such a display could cause erroneous information to be presented. If one lamp fails, for example, the number "8" could be displayed erroneously as 0, 9, or 6, depending on the location of the failed lamp.

Techniques are known in the art which attempt to detect the presence of a lamp failure. For example, panel indicator lamps are available which momentarily apply operating power to the lamp when a special test switch is actuated for that purpose. In the case of the lamps comprising a segmented display, a test circuit can be provided to apply operating power simultaneously to all the lamps in a display so that the failure of a lamp is apparent by its absence of illumination. Such prior art techniques, however, require the testing operation to be conducted apart from the normal operation of the circuit embodying the lamp. Once the test is completed, the lamp is returned to its normal operation in a switched circuit wherein an immediate failure of the lamp may go undetected until the next time the lamps are tested or until some misfortune occurs because the condition which the lamp was to indicate went unnoticed.

Accordingly, it is an object of the present invention to provide improved apparatus for detecting an open-circuit condition in an electrical circuit.

It is another object of this invention to provide apparatus for detecting the existence of an open-circuit condition in an element of an electrical circuit.

It is yet another object of this invention to provide apparatus for detecting the existence of an open-circuit condition in an element of an electrical circuit while the circuit element remains operationally disposed in the circuit.

It is still another object of this invention to provide apparatus for detecting the presence of an open-circuit condition in a switched circuit element irrespective of whether the switch is open or closed.

It is a further object of this invention to provide apparatus for detecting the failure of a lamp in an electrical circuit.

Other objects and many of the attendant advantages of the present invention will be readily apparent from the following specification, including the drawing in which FIG. 1 shows a schematic drawing of an embodiment of the present invention; and FIG. 2 shows a schematic drawing of another embodiment of the present invention.

Stated generally, the present invention comprises an open-circuit indicator which is connected to one side of the lamp or other device whose continuity is being examined. Current flow through the device, including a trickle flow when the device is switched off, biases the failure indicator to indicate continuity. However, if the device becomes open-circuited, as by lamp burn-out, the bias is removed and the failure indicator indicates the open-circuit condition.

Referring now to FIG. 1, a circuit embodying the present invention is shown generally at 10 connected to detect the possible presence of an open-circuit condition in the lamp 11. The lamp 11 is connected in a circuit comprising a source 12 of positive voltage, a diode 13, and a lamp control switch 14 completing the lamp circuit to ground. Although the switch 14 is shown symbolically as a mechanical switch, it is apparent that the switching function of 14 could as well be provided by some other device, such as a semiconductor lamp driving circuit, which is responsive to the condition to be indicated by the lamp 11.

The open-circuit detector includes a suitable indicator which may be a lamp 18 or any other suitable device and which is connected between a negative source 19 and the collector of the transistor 20. The emitter of the transistor 20 is grounded and the base of the transistor is connected through a resistance 21 to the positive source 12. The base of the transistor 20 is also connected through a diode 22 to the connection between the lamp 11 and the diode 13. The failure detection circuit for the lamp 11 is completed by a resistance 23 connected between the negative source 19 and the point of connection between the lamp 11, the diode 13, and the diode 22. The resistance value of resistance 23 is selected to be substantially greater than the resistance of the lamp 11, for a purpose set forth below. A resistance 23 approximately 10 times the resistance of the lamp 11 (or such other device or circuit being evaluated for continuity) has been found to cause satisfactory operation of the invention, although the foregoing is by way of example only and is not intended to limit the resistance of 23 to that relative value.

The operation of the FIG. 1 embodiment is now described with the assumption that the open-circuit indicator lamp 18 is to be lit if, and only if, the lamp 11 burns out or otherwise presents an open-circuit.

Assuming that the lamp 11 is "good," that is, not nonconductive and the switch 14 is open, a small amount of current flows from the positive source 12 through the lamp 11 and the resistance 23 to the negative source 19. The value of the resistance 23 is selected to limit this current flow to an amount which does not produce perceptible illumination of the lamp 11. The current flowing through the resistance 23 establishes a voltage thereacross which is applied to the cathode of the diode 22 to bias this diode into nonconductivity. Accordingly, the base of the transistor 20 is at the voltage level of the positive source 12 and the transistor circuit including the lamp 18 is nonconductive.

Assuming that the switch 14 remains open but that the lamp 11 burns out to become an open-circuit, the positive bias is removed from the cathode of the diode 22; the diode 22 thus becomes forward biased, and the transistor 22 conducts to cause illumination of the lamp 18, indicating the failure of the lamp 11.

Assuming next that the lamp 11 is good and the switch 14 is closed to operate this lamp, the positive voltage developed at the anode of the diode 13 is applied to bias the diode 22 into nonconductivity. The transistor 20 and the lamp 18 thus remain turned off.

Assuming now that the switch 14 is closed and the lamp 11 becomes an open-circuit, the diode 22 is forward biased by the negative supply to permit the transistor 20 to conduct for operating the lamp 18. The negative voltage applied to the diode 13 at this time prevents conduction through the switch 14.

The four alternative conditions of the lamp 11 and the switch 14 are shown above to permit operation of the failure indicator lamp 18 only when the lamp 11 becomes an open-circuit, irrespective of the position of the switch 14. A number of other lamp circuits can be connected through exemplary respective diodes 26, 27, and 28 to the base of the transistor 20 so that the failure of any one lamp in the respective lamp circuits is indicated by operation of the lamp 18. For example, all of the lamps in an alphanumeric character of a segmented display could be connected to a single lamp failure circuit.

The present invention is not limited in its application to detecting failure of indicator lamps. A more general application of the present apparatus is shown in the embodiment of FIG. 2 for detecting an open-circuit condition in the logic circuits 30 and 31. These logic circuits may comprise, for example, AND-elements 32, 33, 34, and 35 having various inputs which are not important to the present invention ad which are not detailed in FIG. 2. The logic circuits operate in a well-known manner to assume certain discrete states determined by the voltage present in the logic circuit. For example, a logic "1" may be represented in a particular circuit, such as logic circuit 30, by 2.8 volts, and a logic "0" may be represented in the same circuit by 0.4 volts.

Each of the logic circuits 30 and 31 is connected through a respective resistance 36 and 37 to a negative source of voltage. The respective logic circuits also are connected through diodes 38 and 39 to a plus-minus detector 40, a device which actuates an indicator 41 only when a negative voltage is sensed. Additional logic circuits can be connected through other diodes to form a summing junction 42 at the input to the plus-minus detector 40.

Assuming that each logic circuit at all times contains a positive voltage, then the diode 38 connected to that logic circuit is biased to a nonconductive state so that the plus-minus detector 40 receives no input voltage, or at least no negative input voltage. If an open-circuit condition occurs, for example, in the logic circuit 30 to remove the positive voltage from that circuit, then the diode 38 is forward biased through the resistance 36 to permit the negative source voltage to be sensed by the detector 40. The resistances 36 and 37 have a high impedance value with respect to the impedance of the logic circuit, so that the addition of the open-circuit detection apparatus does not materially affect the operation of the logic circuit.

Although the foregoing examples of the present invention provide an indication of an open circuit only when a negative voltage is present at a particular point in the circuit being checked, it will be apparent to those skilled in the art that the present invention is as well applicable to circuits wherein the polarities are the reverse of those described in the examples given above for a particular circuit condition. This could be accomplished in the FIG. 1 embodiment, for example, by substituting an NPN transistor for the transistor 20 and by making appropriate changes to the polarities of the supply voltages and of the diodes 13 and 22.

What is claimed is:

1. An electrical circuit including apparatus for evaluating the continuity of the circuit, comprising:
   a first series circuit including an electrical device the continuity of which is being evaluated and a switch means connected to a source of electrical potential;
   resistance means connected between said series circuit and a voltage source of a polarity to establish current flow in a second series circuit including said electrical device and said resistance means irrespective of the operation of said switch means;
   first diode means connected in said first series circuit to permit current flow through said first series circuit when said switch means is closed and to prevent current from flowing through said switch means into said second series circuit; and
   means connected to be responsive to the voltage across said resistance means to provide a signal indicating that said electrical device is nonconductive when no current is flowing in said second series circuit.

2. Apparatus as in claim 1, wherein the resistance of said resistance means is greater than the resistance of said electrical device.

3. Apparatus as in claim 1, wherein said electrical device comprises a source of illumination, and the resistance of said resistance means limits the current flowing in said second series circuit when said switch means is open to an amount which does not produce any perceptible illumination of said source of illumination.

4. Apparatus as in claim 1, wherein:
   said last-mentioned means includes second diode means connected to be responsive to the voltage developed across said resistance means by current flowing through said second series circuit,
   said second diode means being connected to be maintained in a substantially nonconductive state by said voltage developed across said resistance means and to be rendered conductive in the absence of said voltage; and
   signal means connected to be responsive to the conductive state of said second diode means to give an indication of an open-circuit condition of said electrical device when the absence of current through said second series circuit results in the absence of said voltage developed across said resistance means.

5. Apparatus as in claim 4, wherein:
   a first element of said second diode means is connected to receive said voltage developed across said resistance means;
   a second element of said second diode means is connected to be responsive to a voltage source of polarity opposite the polarity of the voltage source to which said resistance means is connected; and
   said signal means is connected to be responsive to conduction through said second diode means to give said open-circuit indication.

6. Apparatus as in claim 4, wherein said electrical device comprises a source of illumination and the resistance of said resistance means limits the current flowing in said second series circuit when said switch means is open to an amount which does not produce any perceptible illumination of said source of illumination.

* * * * *